March 4, 1958     M. S. WOZNIAK     2,825,123

CIRCULAR CUTTING TOOL

Filed Dec. 7, 1954

INVENTOR
MITCHELL S. WOZNIAK

BY Joseph H. Schofield
ATTORNEY

United States Patent Office 2,825,123
Patented Mar. 4, 1958

2,825,123

CIRCULAR CUTTING TOOL

Mitchell S. Wozniak, Portland, Conn., assignor, by direct and mesne assignments, to Joseph T. Chase, Bloomfield, Conn.

Application December 7, 1954, Serial No. 473,531

1 Claim. (Cl. 29—102)

This invention relates to cutting tools for lathes and particularly to a tool of circular cross section contoured axially on its periphery and having a radial cutting surface, the tool being adapted for successive angular adjustments as the cutting surface of the tool is resharpened.

A primary object of the present invention is to provide improved angular adjusting means for the contoured circular cutting tool as it becomes worn and requires angular adjustment to accommodate the resharpening.

More particularly, it is an object of importance of the invention to provide a fine angular adjustment for a circular forming tool for properly positioning the cutting surface of the tool relative to the axis of the work piece being operated on.

Another object of the invention is to provide a coarse angular adjustment of the cutting tool so that substantially the entire periphery of the circular forming tool may be utilized.

With the above and other objects in view, the invention may include the features of construction and operation set forth in the following specification and illustrated in the accompanying drawing.

In the accompanying drawing annexed hereto and forming a part of this specification, I have shown the invention embodied in a holder and mounting of improved type for a standard type of circular forming tool, but it will be understood that the invention may be otherwise embodied and that the drawing is not to be construed as defining or limiting the scope of the invention, the claim appended to this specification being relied upon for that purpose.

Figure 1:
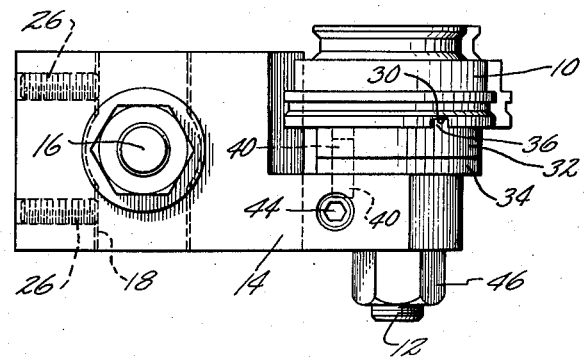
Fig. 1 is a plan view of a complete circular forming tool and its mounting for positioning and fastening the tool to a lathe cross-slide.

In the above mentioned drawing, there has been shown but one embodiment of the invention which is now deemed preferable, but it is to be understood that changes and modifications may be made within the scope of the appended claim without departing from the spirit of the invention.

Referring more in particular to the figures of the drawing, it will be seen that the cutting tool comprises a generally cylindrical member 10 having its periphery contoured to the form desired to be reproduced. Any contour may be formed on this periphery co-axially of the cutting tool center line. Extending laterally from the center of one end face of the cutting tool 10 is a threaded portion 12 by means of which the cutting tool may be mounted for rotative adjustment about a fixed axis within a tool head 14.

The tool head 14 may be mounted on and secured in fixed position to a lathe cross-slide (not shown). A clamping bolt 16 engaging within a slot formed in the cross-slide is provided for clamping the tool head 14 and a block member 18 having a transverse tongue 20 inserted in a transverse groove in the head serves to retain the head 14 in fixed angular position. As shown in Fig. 2 a supplementary block 22 to raise the tool head 14 may be provided having a recess in its upper surface engaging the tongue 20 of the transverse block member 18 and a tongue 24 on its lower surface. The transverse block member 18 may be clamped in position within the tool head 14 by set screws 26 as shown in Figs. 1 and 2.

The forward portion of the head 14 is recessed on one side and a horizontal opening 28 provided through which the threaded extension 12 on the cutting tool 10 extends. The end face of the cutting tool 10 is provided with a radially extending slot 30 and between the slotted end face of the cutting tool 10 and the side surface of the recessed portion of the head 14 are two disk like members 32 and 34. The first of these disk members 32 has a radially and laterally extending member or key 36 adapted to fit within the slot 30 in the cutting tool 10. Also provided in this disk 32 are spaced axially extending holes 38 arranged in an annular series. Against the outer face of this disk 32 is the second disk 34 having a pin 40 extending therethrough and from opposite faces of the disk 34. One end of the pin 40 may enter one of the holes in the first disk 32. The opposite end of the pin 40 enters an elongated slot 42 in the head 14. Intercepting the slot 42 is a member 44 threaded through the head 14 and having its central portion reduced in diameter as shown in Fig. 2 to form an unthreaded neck portion. The pin 40 in the disk 34 engages within the recess 42 in the head 14 and between the threaded ends of the screw 44.

Figure 2:
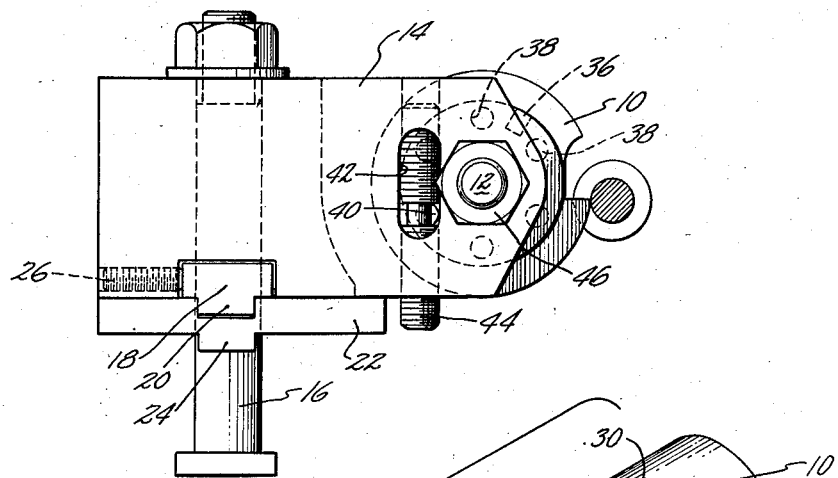
Fig. 2 is a side elevation of the tool and mounting shown in Fig. 1.
Figure 3:
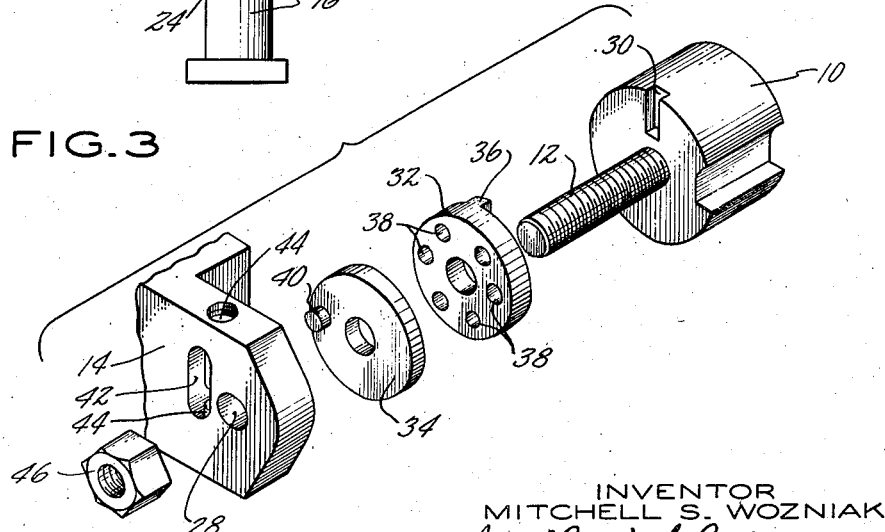
Fig. 3 is an exploded perspective view of the parts forming the cutting tool, the one shown having an uncontoured cylindrical periphery and the present form of angular adjusting means.

With the parts positioned as shown in Figs. 1 and 2, rotation of the screw 44 will angularly adjust the rotative position of the disk 34. This movement will also angularly adjust the first disk 32 by engagement of the pin 40 with one of the holes 38 in the first disk 32. The cutting tool 10 will therefore be adjusted angularly by engagement of the projection 36 on the first disk 32 with the slot 30 formed in the cutting tool 10. By slight rotation of the screw 44 therefore a slight rotative movement can be given the cutting tool 10 to compensate for wear and to adjust the cutting surface to the proper cutting position after resharpening.

In addition to the fine angular adjustment of the cutting tool 10 by the screw 44 the pin 40 may be positioned successively in the holes 38 in the disk 32 so that wide angular adjustment of the cutting tool may be effected. To retain the cutting tool 10 and disks 32 and 34 in position on the head 14 a nut 46 is threaded on the end of extension 12. To effect the angular adjustments of the tool 10 it is only necessary to loosen the nut 46 on the threaded extension and rotate the screw 44 or by further loosening the nut 46 position the pin 40 in another hole 38 in the disk 32.

I claim as my invention:

Mounting means for a circular cutting tool comprising a tool head having a horizontal opening extending therethrough, a generally cylindrical cutting tool thereon having a contoured edge on its periphery, a threaded extension formed on said cutting tool and extending through said opening, a nut on said threaded portion to secure said cutting tool to said head, two disks mounted on said threaded portion between the end faces of said cutting tool and said head, the first of said disks having a protrusion forming a key engaging a notch in the adjacent face of said cutting tool and having an annular series of holes, the second of said disks having a pin extending therethrough, the ends of said pin projecting from both sides of said second disk, one of said ends being adapted to enter any of said holes in said first disk, and a threaded member in said head, said member having an intermediate recessed portion, the walls of said recessed portion engaging opposite sides of the other end of said pin, whereby rotation of said threaded member will laterally displace said pin and thereby angularly adjust said second disk together with said first disk and said cutting tool about their aligned axes.

References Cited in the file of this patent

UNITED STATES PATENTS

| | | |
|---|---|---|
| 602,625 | La Fave | Apr. 19, 1898 |
| 767,598 | Search et al. | Aug. 16, 1904 |
| 810,238 | Waite | Jan. 16, 1906 |
| 858,440 | Chapman | July 2, 1907 |
| 927,527 | Hanson | July 13, 1909 |
| 1,222,178 | Browand | Apr. 10, 1917 |
| 2,341,660 | Schillberg | Feb. 15, 1944 |
| 2,538,284 | Sumner | Jan. 16, 1951 |